(12) United States Patent
Shropshire

(10) Patent No.: US 9,491,221 B1
(45) Date of Patent: Nov. 8, 2016

(54) SYSTEM AND METHOD FOR BROKERING DISTRIBUTED COMPUTATION

(71) Applicant: Google Inc., Mountain View, CA (US)

(72) Inventor: Benjamin Shropshire, Mountain View, CA (US)

(73) Assignee: Google Inc., Mountain View, CA (US)

( * ) Notice: Subject to any disclaimer, the term of this patent is extended or adjusted under 35 U.S.C. 154(b) by 282 days.

(21) Appl. No.: 13/706,123

(22) Filed: Dec. 5, 2012

(51) Int. Cl.
*G06F 15/16* (2006.01)
*H04L 29/08* (2006.01)

(52) U.S. Cl.
CPC .................................... *H04L 67/00* (2013.01)

(58) Field of Classification Search
CPC ..... H04L 67/10; H04L 65/103; H04L 67/02; H04L 67/28; H04L 43/50; H04L 12/2697; H04L 29/12009; H04L 29/12047; H04L 29/12783; H04L 41/048; H04L 41/5308; H04L 61/15; H04L 61/35; H04L 67/16; H04L 41/0233; H04L 67/26; H04L 67/325; G06F 9/5072; G06F 11/3414; G06F 11/3672; G06F 2201/875; G06F 2209/5017; G06F 9/5044; G06F 15/16; G06F 17/3002; G06F 2209/5021; G06F 2209/503; G06F 2209/508; G06F 2209/5015; G06F 9/5055
See application file for complete search history.

(56) References Cited

U.S. PATENT DOCUMENTS

| | | | |
|---|---|---|---|
| 6,757,730 B1 * | 6/2004 | Lee .......................... | G06F 9/465 709/201 |
| 8,117,258 B2 * | 2/2012 | Shuster ................. | G06F 9/5072 709/203 |
| 2002/0019844 A1 * | 2/2002 | Kurowski ............. | G06F 9/5072 709/201 |
| 2002/0091752 A1 * | 7/2002 | Firlie ..................... | G06F 9/5027 709/201 |
| 2005/0071298 A1 * | 3/2005 | Forman ................... | G06Q 30/04 705/412 |
| 2006/0195508 A1 * | 8/2006 | Bernardin ............... | G06F 9/505 709/203 |
| 2008/0127196 A1 * | 5/2008 | Barsness ................. | G06Q 10/06 718/104 |
| 2008/0291908 A1 * | 11/2008 | Bachmann ............. | G06F 9/5055 370/389 |
| 2010/0332262 A1 | 12/2010 | Horvitz et al. | |
| 2011/0320516 A1 * | 12/2011 | Boldyrev ................ | G06F 9/461 709/201 |

OTHER PUBLICATIONS

May, M. "Locust—A Brokerage System for Accessing Idle Resources in Web-Computing", EUROMICRO Conference 1999. Proceedings 25$^{th}$ Year 1999, vol. 2, pp. 466-473.*
(Continued)

*Primary Examiner* — Kevin Bates
*Assistant Examiner* — Ranjan Pant
(74) *Attorney, Agent, or Firm* — Fish & Richardson P.C.

(57) ABSTRACT

A method and apparatus for distributed computing in a brokering environment is disclosed. In this environment, the broker system receives a program and data set from a consumer system and partitions them into sub programs and data subsets, respectively, and generates a trigger that is communicated to a web property system that includes a web property over a first communication path. When the web property is accessed by an end user computer, the end user computer responds to the trigger and sends a request to the broker system via a second communication path. In response, the broker system communicates a subprogram and data subset, via the second communication path, to the end user computer, which executes the subprogram and data subset and communicates the resulting data to the broker system, which may communicate the resulting data to the consumer system.

22 Claims, 8 Drawing Sheets

(56) References Cited

OTHER PUBLICATIONS

Michael May, "Locust—A Brokerage System for Accessing Idle Resources for Web-Computing" Euromicro Conference, 1999. Proceedings 25th.

Remo Suppi et al., "Web-Based Distributed Computing Using Parasite" Proceedings of the Eleventh Euromicro Conference on Parallel, Distributed and Network-Based Processing (Euro-PDP'03) 2003.

* cited by examiner

SYSTEM AND METHOD FOR BROKERING DISTRIBUTED COMPUTATION

BACKGROUND

Distributed computation generally refers to the use of distributed systems to solve computational problems. Distributed systems generally include multiple nodes that communicate via a network. In distributed computation, computational problems are divided into tasks, each of which may be solved by one or more nodes in the distributed system. For example, if the computational problem is in the form of a computer executable program and a data set, the program and/or the data set may be partitioned into subprograms and/or data subsets, respectively. A task generally includes a subprogram and a data subset. Each task may be executed by one or more computers in the distributed system.

One example of a resource for distributed computing is the Internet. Large numbers of computers ("end user computers"), with underutilized processing capability, are connected with the Internet at any given time. This underutilized processing capability has been utilized in connection with the computational problems involved with gene sequencing and SETI (Search for Extraterrestrial Intelligence).

SUMMARY

An example of a method for brokering distributed computation over multiple end user computers ("brokering method") is provided. In this example, the brokering method generally includes, but is not limited to, receiving a data set and a computer executable program including at least one data subset and at least one computer executable subprogram, respectively; communicating a trigger via a first communication path, wherein the trigger is configured to be associated with a web property system that includes a web property, wherein the trigger may also be configured to be responded to by one or more of the end user computers when the web property is accessed by one or more of the end user computers via a second communication path; receiving a request from one or more of the plurality of end user computers via a third communication path; in response to the request, communicating the at least one first computer executable subprogram and the at least one data subset to one or more of the end user computers via the third communication path; and receiving data resulting from executing the at least one computer executable subprograms with the at least one data subset on one or more of the end user computers from one or more of the end user computers via the third communication path.

The brokering method may include partitioning the data set and/or the computer executable program into at least two data subsets and/or at least two computer executable subprograms, respectably. The brokering method may include processing the data resulting from executing at least one computer executable program with at least one data subset and/or preprocessing the computer executable program. The brokering system may further include communicating the data resulting from executing the at least on computer executable subprogram to at least one of the end user computers for execution by one or more of the end user computers. The data set and/or computer executable program may be received from the consumer system and the brokering method may include facilitating compensation for services provided by the broker system and/or the web property system by the consumer. The trigger may be implemented in an iframe, snippet, agent, application and/or widget.

Another example of a brokering method is provided and may include, but is not limited to, communicating a trigger via a first communication path to a web property system that includes a web page, wherein the trigger is configured to be associated with a web property system and responded to by one or more end user computers when the web property is accessed by one or more of the plurality of end user computers; receiving a request generated by the computer executable program from one or more of the end user computers in response to the trigger via a third communication path in response to the request, communicating one or more computer executable subprograms and one or more data subsets to one or more of the end user computers via the third communication path and receiving data resulting from executing one or more of the computer executable subprograms with one or more of the data subsets on one or more of the end user computers from one or more of the end user computers via the third communication path.

An example of a brokering system for distributed computation (the "brokering system") is disclosed. Data is computed in the brokering system by executing at least one computer executable subprogram of a computer executable program with at least one data subset of a data set by end user computers. The brokering system generally includes, but is not limited to, a database configured to store at least one computer executable subprogram, at least one data subset and a trigger; a first interface in communication with a web property system that includes a web property via a first communication path, wherein the first interface is configured to communicate the trigger to the web property; a second interface in communication with at least one of the end user computers via a second communication path, wherein the second interface is configured to communicate at least one data subset and the at least one computer executable subprogram to at least one of the end user computers and receive the data from the at least one of the end user computers via the second communication path.

The brokering system may include a data set partitioning module for partitioning the data set into one or more data subsets and/or a program partitioning module for partitioning the computer executable program into the one or more computer executable subprograms, respectively.

The brokering system may include a third interface in communication with a consumer system via a third communication path, wherein the third interface is configured to receive the at least one computer executable subprogram and the at least one data subset from the consumer system.

The brokering system may include a transaction processing module configured to facilitate a relationship between a web property system and a consumer system.

The brokering system may include a preprocessing module and/or a trigger module that produces the trigger and/or a data processing module.

An example of a non-transitory computer readable storage medium is presented. The non-transitory computer readable storage medium stores instructions that when executed by a processor perform a method for brokering distributed computation over a plurality of end user computers. The method may include, but is not limited to, receiving a data set including at least one data subset; receiving a computer executable program including at least one computer executable subprogram; communicating a trigger to a web property system that includes a web property via a first communication path, wherein the trigger is configured to be associated with the web property and responded to by one or more of the plurality of end user computers when the web property is accessed by one or more of the plurality of end user computers via a second communication path; receiving a request from one or more of the plurality of end user computers via a third communication path, wherein the request is generated in response to the trigger; communicating the at least one computer executable subprogram and the at least one data subset to one or more of the plurality of end user computers via the third communication path in response to the request; and receiving data resulting from executing the at least one computer executable subprogram with the at least one data subset on one or more of the plurality of end user computers from one or more of the plurality of end user computers via the third communication path.

BRIEF DESCRIPTION OF THE DRAWINGS

In the accompanying figures, like reference numerals refer to identical or functionally similar elements throughout the separate views.

Figure 1:
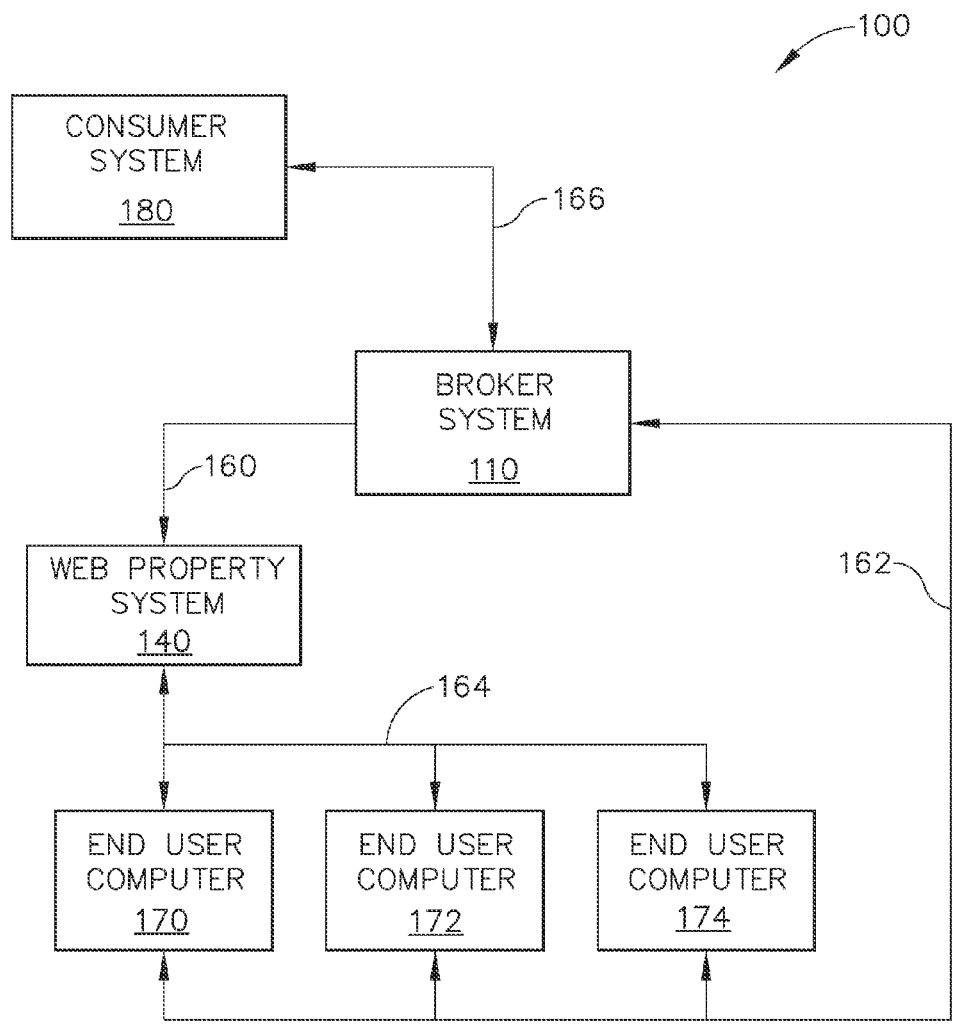
FIG. 1 is a block diagram of an exemplary broker environment for distributed computation.

Elements in the figures are illustrated for simplicity and clarity and have not necessarily been drawn to scale. For example, the dimensions of some of the elements in the figures may be exaggerated relative to other elements. Further, the apparatus and method components have been represented, where appropriate, by conventional symbols in the drawings.

DETAILED DESCRIPTION

Brokering of distributed computation ("brokering") brings together consumers of distributed computation ("consumers") with website publishers. Website publishers may include one or more entities, such as a person or corporation, which is generally the primary claimant to the rewards and/or benefits resulting from usage of a website. Website publishers may also publish and maintain the website. Web properties, such as websites, provide a way for consumers to access the distributed computational capability of computers connected to the Internet ("end user computers") to help solve the consumer's computational problem. Brokering enables consumers to gain this access and website publishers to be compensated for providing such access. Brokers of distributed computing ("brokers") facilitate the financial and logistical aspects of the consumer/website publisher relationship. In addition, brokers facilitate the distributed computational process by communicating the consumer's computational problem to the end user computers, receiving the results generated by the end user computers and communicating the results to the consumer.

FIG. 1 depicts an example of a brokering environment for distributed computation ("brokering environment") 100. This brokering environment 100 generally includes a broker system 110, a web property system 140, end user computers 170, 172, 174 and a consumer system 180. In general, the broker system 110 facilitates interactions between the consumer system 180 and the web property system 140. The broker system 110 is in communication with the web property system 140 via a broker/property communication path 160 and with the end user computers 170, 172, 174 via a broker/end user communication path 162. The broker system 110 may also be in communication with the consumer system 180 via the broker/consumer communication path 166. The web property system 140 may also be in communication with the end user computers 170, 172, 174 via the property/end user communication path 164.

Communications paths 160, 162, 164, 166 may traverse one or more communications systems that include, alone or in combination, wired and/or wireless communication technologies. Examples of wired communication technologies include, but are not limited to twisted pair wire, coaxial cable and optical cable. Examples of wireless communication technologies include, but are not limited to, terrestrial microwave, communication satellites, cellular systems, PCS systems, wireless local area networks (WLAN), infrared communications and global area networks (GAN).

Although three end user computers 170, 172, 174 are shown in the brokering environment 100, the brokering environment 100 may include any number of end user computers, which may be in communication with the broker system 110 and the web property system 140 in a manner similar to that of the end user computers 170, 172, 174.

Figure 2:
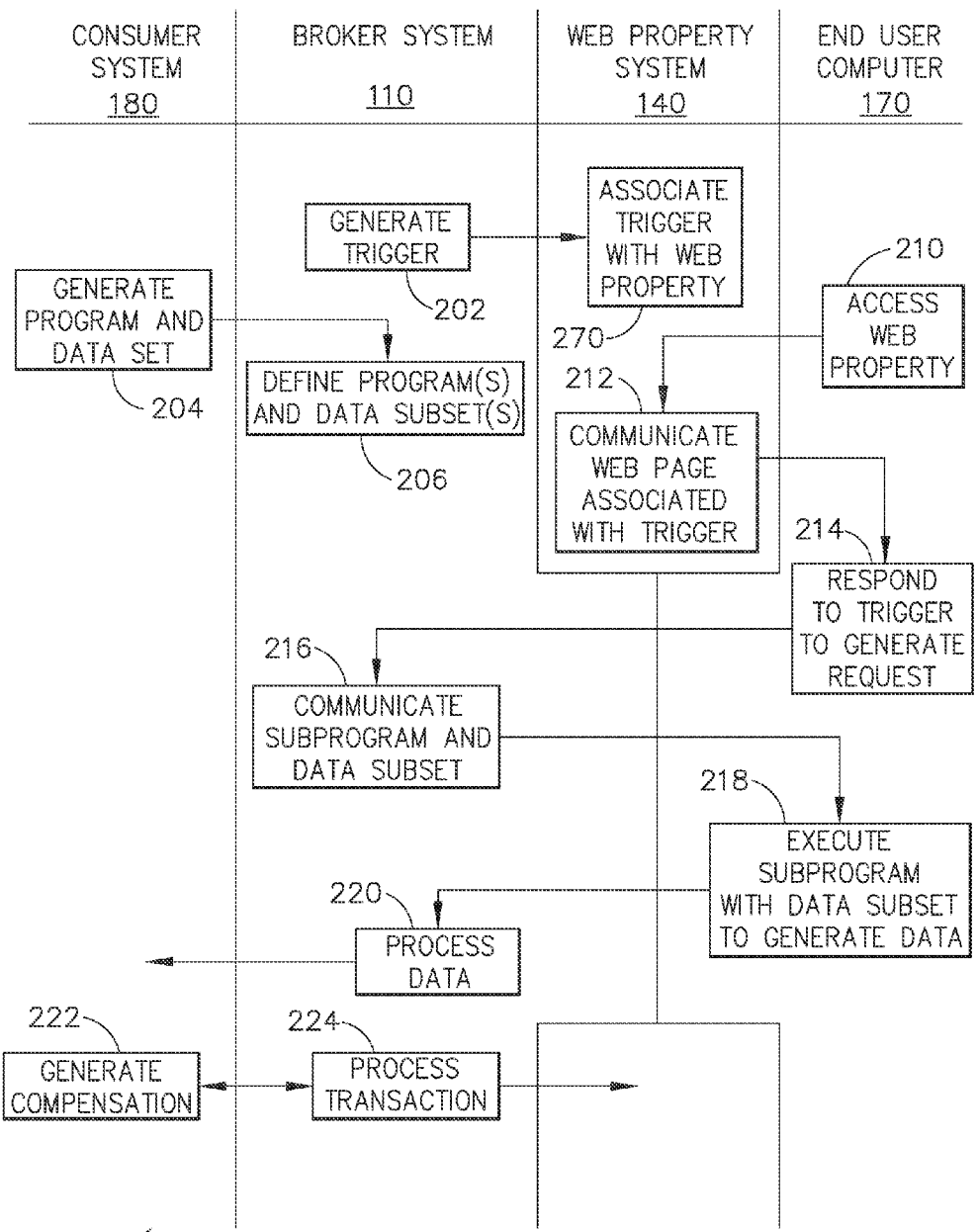
FIG. 2 is a swim-lane representation of an exemplary method for distributed computation in a brokering environment.

FIG. 2 depicts an example of a method for distributed computation in a brokering environment ("distributed computation method") 200. In step 204, the consumer system 180 defines a computational problem to be solved by generating a computer executable program and a data set and communicates the computer executable program and data set to the broker system 110. The computer executable program and data set include one or more computer executable subprograms and one or more data subsets, respectively. In step 206, the broker system 110 defines one or more computer executable subprograms and/or one or more data subsets, respectively, which may involve partitioning the computer executable program and/or data set. Partitioning may be performed, alternately, by the consumer system 180, which then communicates the one or more computer executable subprograms and one or more data subsets to the broker system 110.

In step 202, the broker system 110 generates a trigger. This trigger may include a snippet (such as, an agent). The web property system 140 associates the trigger with a web property such as a web page on the web property system 140. The trigger generally includes, for example, the address of the broker system 110 and/or other information and instructions for communicating with the broker system 110. The trigger may be associated with the web property by including it in an iframe, snippet, agent, or an Adobe Flash® or Microsoft Silverlight® application or widget.

When an end user computer 170 accesses to the web property in step 210, the web property system 140 communicates the web property with the trigger to the end user computer 170 in step 212.

In step 214, the end user computer 170 responds to the trigger by generating a request, which the end user computer 170 communicates to the broker system 110. In response to receiving the request, the broker system 110 communicates a subprogram and data subset to the end user computer 170 in step 216. The end user computer 170 executes the subprogram with the data subset to generate data and communicates the data to the broker system 110 in step 218.

As shown in this example, the broker system 110 may process the data in step 220. After the data is processed by the broker system 110 in step 220 and/or after the data is generated in step 218, the broker system communicates the data to the consumer system 180.

In step 222, the consumer system 180 may generate compensation for the services provided by the broker system 110 and/or the web property system 140 and communicates the compensation to the broker system 110.

In step 224, the broker system 110 processes the transaction between the consumer system 180 and the web property system 140 to facilitate compensation by the consumer system 180 for the services performed by the broker system 110 and the web property system 140. Step 224 may be performed before, during and/or after the consumer system 180 communicates compensation to the broker system 110. In one example, step 224 includes requesting compensation from the consumer system 180, receiving compensation from the consumer system 180, retaining a portion of the compensation and communicating the remaining compensation to the web property system 140.

The consumer system 180, end user computer 170, web property system 140 and the broker system 110 are shown in FIGS. 3, 4, 5, and 6 respectively. With reference to FIGS. 3, 4, 5 and 6, the consumer system 180, end user computer 170, web property system 140 and broker system 110 each generally include a processor 320, 420, 520 and 620, respectively. Processors 320, 420, 520 and 620 include one or more devices capable of processing digital information, such as a microprocessor. The processors 320, 420, 520 and 620 may be implemented as shown in FIGS. 3, 4, 5 and 6. However, the processors may be implemented in one or more devices located in, near and/or remote from the consumer system 180, end user computer 170, web property system 140 and broker system 110.

The consumer system 180, end user computer 170, web property system 140 and broker system 110 each generally include a memory 310, 410, 510 and 610, respectively. Memories 310, 410, 510 and 610 include any device or devices capable of storing computer readable instructions and/or data. Memories 310, 410, 510 and 610 may include magnetic media like a floppy disk that may be read by a floppy disk drive, a hard disk drive and magnetic tape; optical media like a Compact Disc (CD), a Digital Video Disk (DVD), and a Blu-ray Disc which may be read by an optical disk drive; and solid state memory such as random access memory (RAM), flash memory, and read only memory (ROM). The memories 310, 410, 510 and 610 may be implemented as shown in FIGS. 3, 4, 5 and 6. However, the memories may be implemented in one or more devices located in, near and/or remote from the consumer system 180, end user computer 170, web property system, 140 and broker system 110.

The consumer system 180 may include a program partitioning module 314 and a data set partitioning module 316 stored in memory 310. The broker system 110 may include a trigger module 674, data processing module 676, preprocessing module 680 and a transaction processing module 682 stored in memory 610. The broker system 110 may further include a program partitioning module 670 and/or a data set partitioning module 672 in the memory 610. These modules may include computer executable software. Alternatively, the modules may be implemented apart from memories 310 and 610, respectively. In this case, they may include separate devices, which may include a processor and/or memory in which the computer readable software is stored.

The consumer system 180, end user computer 170, web property system 140 and broker system 110 each generally include one or more interfaces. For example, the consumer system 180 and web property system 140 each may include a broker system interface 330 and 530, respectively. The end user computer 170 may include a system interface 470. The broker system 110 may include a web property system interface 630, an end user computer interface 642 and a consumer system interface 660. The web property system 140 may include a web/end user interface 560. These interfaces 330, 530, 460, 560, 630, 640 and 660 include input and output devices and computer executable software that enable the consumer system 180, end user computer 170, web property system 140 and broker system 110 to communicate with each other over communications paths 160, 162, 164, 166. For example, broker system interfaces 330 and 530 and the system interface 470 enable the consumer system 180, web property system 140 and the end user computer 170 to communicate with the broker system 110 via communications paths 166, 160 and 162 respectively. The web property system interface 630, end user computer interface 642 and consumer system interface 660 enable the broker system 110 to communicate with the web property system 140, end user computer 170, and the consumer system 180, respectively, via communications paths 160, 162 and 166, respectively. The system interface 470 enables the end user computer 170 to communicate with the web property system 140 and the web/end user interface 560 enables the web property system 140 to communicate with the end user computer 170.

The interfaces 330, 530, 470, 560, 630, 640 and 660 generally include devices and/or software capable of generating, transmitting and receiving electrical and/or electromagnetic signals via communications paths 160, 162 and 164. For example, the interfaces 330, 530, 460, 560, 630, 640 and 660 may include a wired device, such as a modem and/or a wireless device, such as a radio. The radio may communicate according to various communications protocols such as, WiMAX™, 802.11 a/b/g/n, Bluetooth™, 2G, 3G, and 4G.

The consumer system 180, broker system 110, web property system 140 and end user computer 170 generally include a bus 340, 640, 540 and 440, respectively. The buses 340, 640, 540 and 440 include a subsystem that transfers data between components of the consumer system 180, broker system 110, web property system 140 and end user computer 170, respectively.

Figure 3:
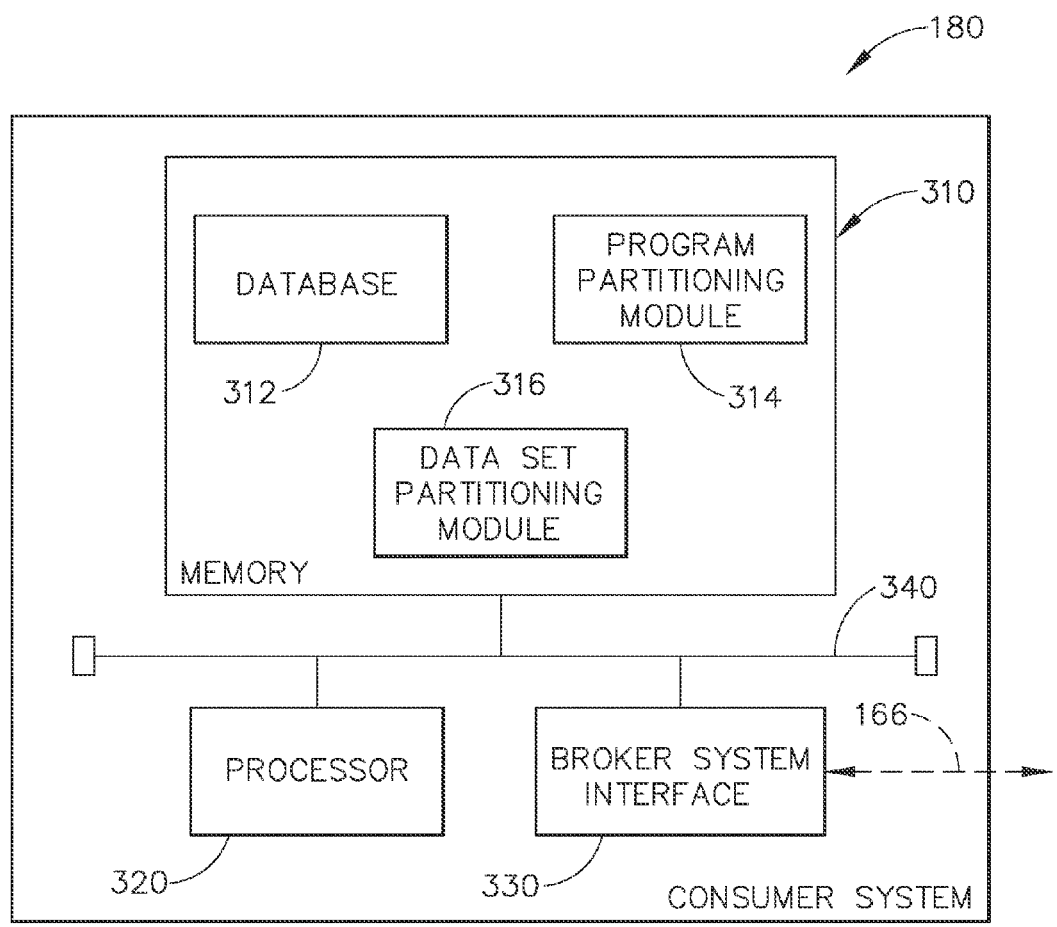
FIG. 3 is a block diagram of an exemplary consumer system.

Referring to FIGS. 1 and 3, the consumer system 180 generally includes a memory 310, processor 320 and bus 340. The consumer system 180 may also include a broker system interface 330. Memory 310, processor 320 and broker system interface 330 may be in communication with each other via bus 340. The memory 310 generally includes a database 312, and may include a program partitioning module 314 and/or a data set partitioning module 316. The database 310 stores data relating to a program and data set.

The program partitioning module 314 and data set partitioning module 316 may include software capable of being executed by processor 320. The program partitioning module 314 and data set partitioning module 316 may include separate processors and/or memory for executing the software. The program partitioning module 314 receives the program from the database 312 and partitions the program into multiple subprograms. The data set partitioning module 316 receives the data set from the database 312 and partitions the data set into multiple data subsets. The program subsets and data subsets may be stored in the database 312 or other part of memory 310. The broker system interface 330 may communicate the program, data set, subprograms and/or data subsets to and receive data from the broker system 110 via communication path 166.

Figure 4:
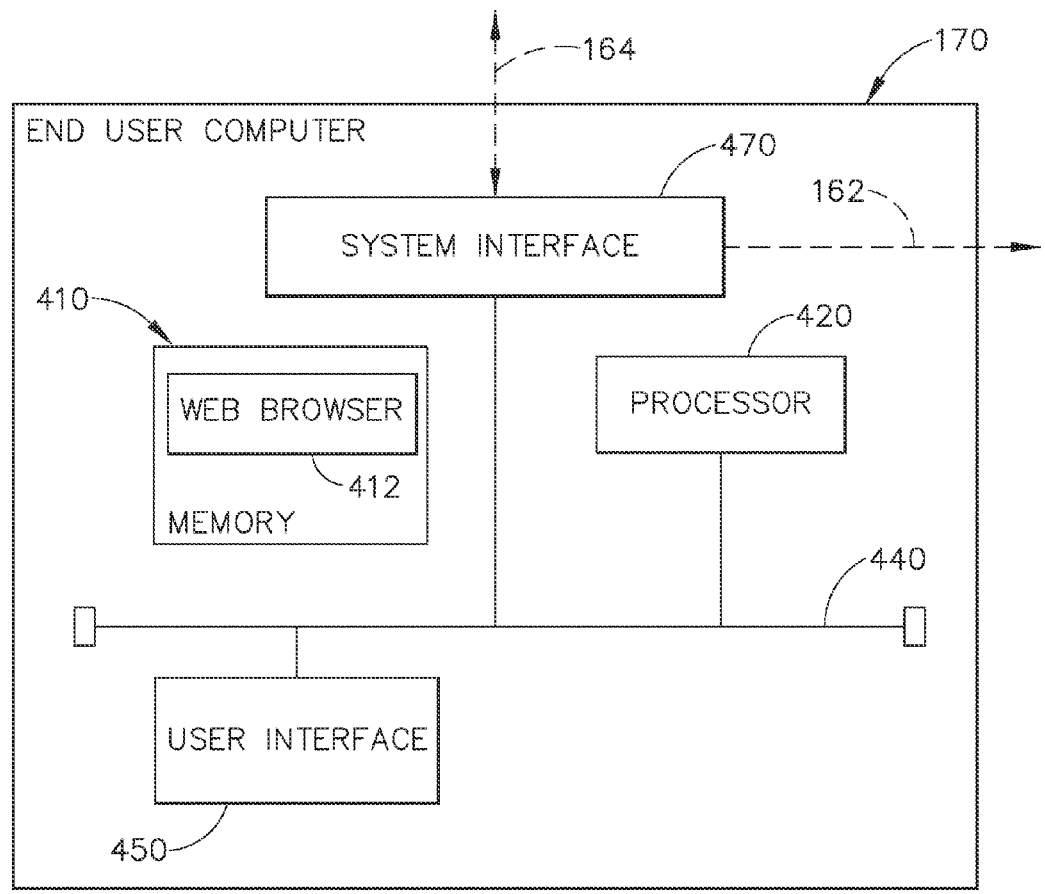
FIG. 4 is a block diagram of an exemplary end user computer.

Referring to FIGS. 1 and 4, the end user computer 170 (and similarly end user computers 172, 174) generally include a memory 410, processor 420, user interface 450, system interface 470 and bus 440. Memory 410, processor 420, user interface 450 and system interface 470 may be in communication with each other via bus 440.

The memory 410 generally stores a web browser 412. The web browser 412 includes computer executable software used for accessing sites and information on the World Wide Web ("WWW") and may be executed by processor 420. The web browser 412 generally retrieves, presents and traverses information resources, such as a website. The web browser 412 may access a website according to the website's uniform resource locator ("URL"). Examples of web browsers include, Internet Explorer®, Safari®, Firefox® and Google Chrome®.

The user interface 450 includes input devices, output devices and/or combinations of the two. Input devices include devices through which data and/or computer executable software may entered into the end user computer 170, either automatically or by a user who enters commands and data. Input devices may include: an electronic digitizer or drawing board; a barcode reader, an RFID reader, a debit card reader, or any near-field communication ("NFC") reader; a microphone; an image capture device such as a camera, a video camera, or a digital flatbed or sheet-fed scanner; a keyboard, a numeric pin pad, any device which has a series of depressible keys; a pointing device, such as a mouse, a trackball or a touch pad; any memory device, any Bluetooth™ enabled device, or any networked device able to generate and transmit a signal. Other input devices may include a joystick, game pad, satellite dish, an instrument, a sensor, and the like. The user interface 450 may also include output devices including devices through which data may be communicated to a user such as, a monitor, printer and speaker. The user interface 450 may include a combination input/output device such as a touch screen.

The system interface 470 may communicate requests and data to and receive one or more subprograms and subsets from the broker system 110 via communication path 162. The system interface 470 may also communicate with the web property system 140 via communication path 164. In general, the system interface 470 utilizes the web browser 412 in memory 410 to request access to the web property system 140. The web browser 412 may render the resource communicated to the end user computer 170 via a user interface 450 such as, a monitor. In an alternate example, the web browser 412 may be stored in a memory included in the system interface 470.

Figure 5:
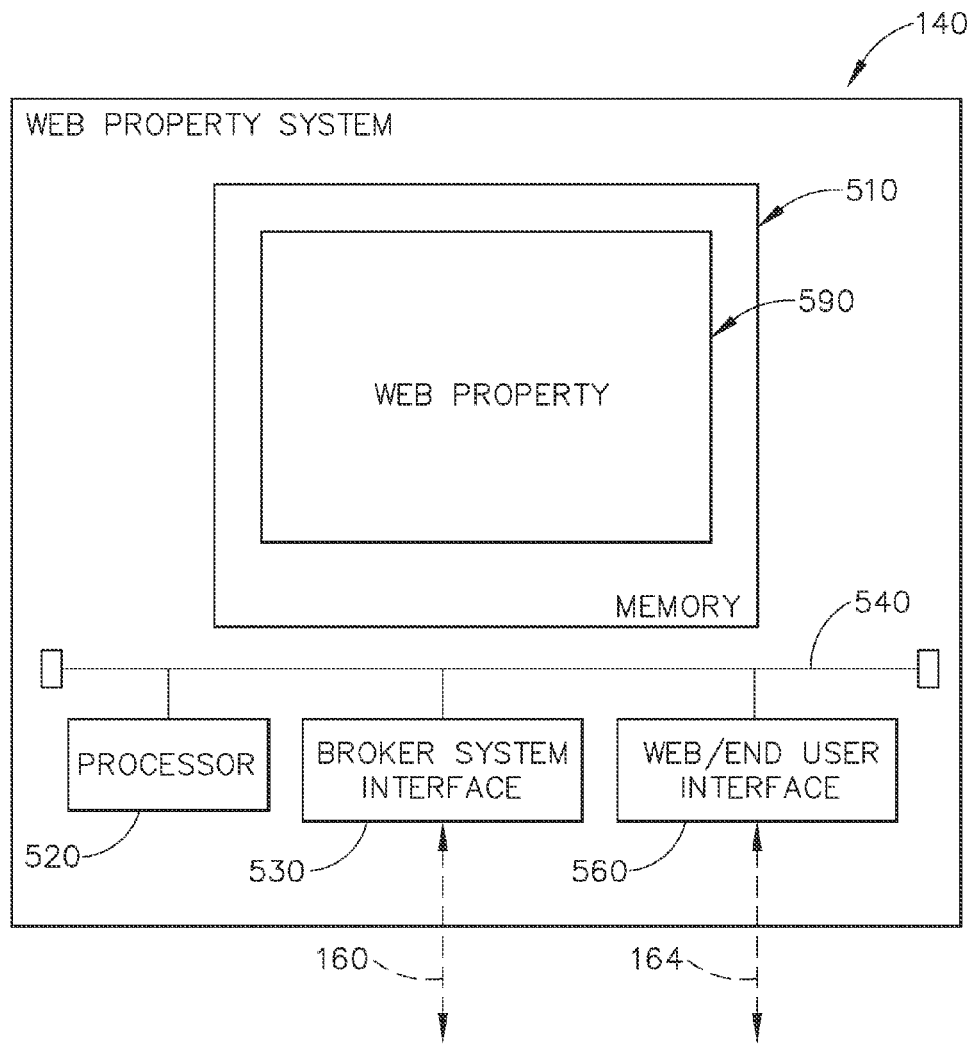
FIG. 5 is a block diagram of an exemplary web property system implemented in a web server.

Referring to FIGS. 1 and 5, the web property system 140 generally includes hardware and/or software that enable delivery of web property 590 via a network such as the Internet. The web property system 140 generally includes a memory 510, processor 520, broker system interface 530, web/end user interface 560 and bus 540. Memory 510, processor 520, broker system interface 530 and web/end user interface 560 may be in communication with each other via bus 540.

The broker system interface 530 is in communication with the broker system 110 via communication path 160. The broker system interface 530 receives a trigger from the broker system 110. This trigger may or may not be visible to the user of the end user computer 170.

The memory 510 generally stores the web property 590, such as a website. The web property 590 may include one or more web pages. The web/end user interface 560 communicates the web property 590 with the trigger to the end user computer 170, when accessed by the web browser 412 of the end user computer 170 (FIG. 4) via communication path 164.

Figure 6:
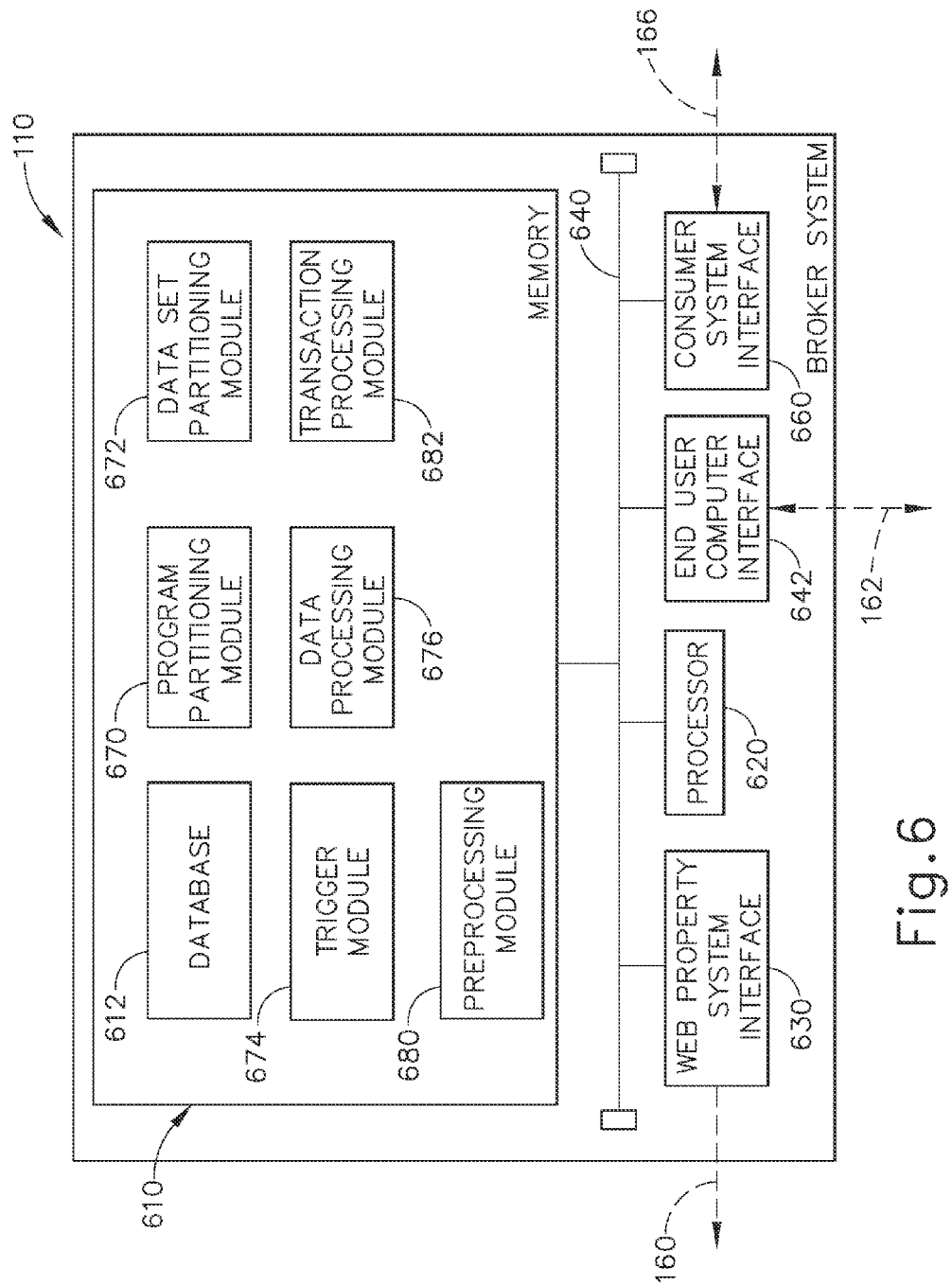
FIG. 6 is a block diagram of an exemplary broker system.

Referring to FIGS. 1 and 6, the broker system 110 generally includes a memory 610, processor 620, web property system interface 630, an end user computer interface 642, a consumer system interface 660 and a bus 640.

The broker system 110 communicates various data to and receives the program, data set, subprogram and/or data subset from the consumer system 180 via communication path 166. The memory 610 may include a database 612 in which the program, data set, subprogram and/or data subset may be stored. The memory 610 may include a program partitioning module 670 and/or a data set partitioning module 672. The program partitioning module 670 and data set partitioning module 672 may include software capable of being executed by processor 620. The program partitioning module 670 and data set partitioning module 672 may include separate processors and/or memory for executing the software. The program partitioning module 670 receives the program from the database 612 and partitions the program into multiple subprograms. The data set partitioning module 672 receives the data set from the database 612 and partitions the data set into multiple data subsets. The program subsets and data subsets may be stored in the database 612 or other part of memory 610.

The broker system 110 may include a trigger module 674. The trigger module 674 generates a trigger. The trigger may be communicated to the web property system 140 via the web property system interface 630 over communication path 160.

When associated with the web property system 140, the trigger is responded to by the end user computer 170 when the end user computer 170 accesses the web property system 140. This may be done automatically or with the consent of the user of the end user computer 170. In response to the trigger, the end user computer 170 generates a request to the broker system 110 for a subprogram and a data subset, receives the subprogram and data subset from the broker system 110 and communicates the data generated by executing the subprogram with the data subset to the broker system 110 using the end user computer interface 642 via communication path 162.

The broker system 110 may include a data processing module 676. The data processing module 676 may include software capable of being executed by processor 620. The data processing module 676 may aggregate, group, organize, arrange and/or perform other sorting, statistical and/or other computational operations on the data resulting from executing the subprogram with the data subset on end user computer 170 and/or with data resulting from executing subprograms with data subsets from other computer executable programs and data sets, respectively, on other end user computers, such as end user computer 172 and/or end user computer 174. The broker system 110 may communicate the data resulting from executing the subprogram with the data subset and/or data created by the data processing module 676 with the consumer system 180 using consumer interface module 660 via communication path 166.

The broker system 110 may include a transaction processing module 682. The transaction processing module 682 may include software capable of being executed by processor 620. The transaction processing module 682 facilitates the transaction between the consumer system 180 and web property system 140. For example, the transaction processing module 682 may obtain compensation from the consumer system 180 and communicate all or a portion of the compensation to the web property system 140.

The broker system 110 may include a preprocessing module 680. The preprocessing module 680 may include software capable of being executed by processor 620. The preprocessing module 680 may perform one or more actions on the program or subprogram after the program or subprogram is received from the consumer system 180. These actions may include one or more of the following: language translation (for example, translating from a parallel processing language to JavaScript™, sanitization, partitioning, obfuscation, optimization, compression, tamper hardening (for example, making it harder for an end user computer to submit incorrect results and/or making it easier to detect such end user computers) and rate limitation (for example, preventing the program from using too much of the end user computer's processing capability).

Figure 7:
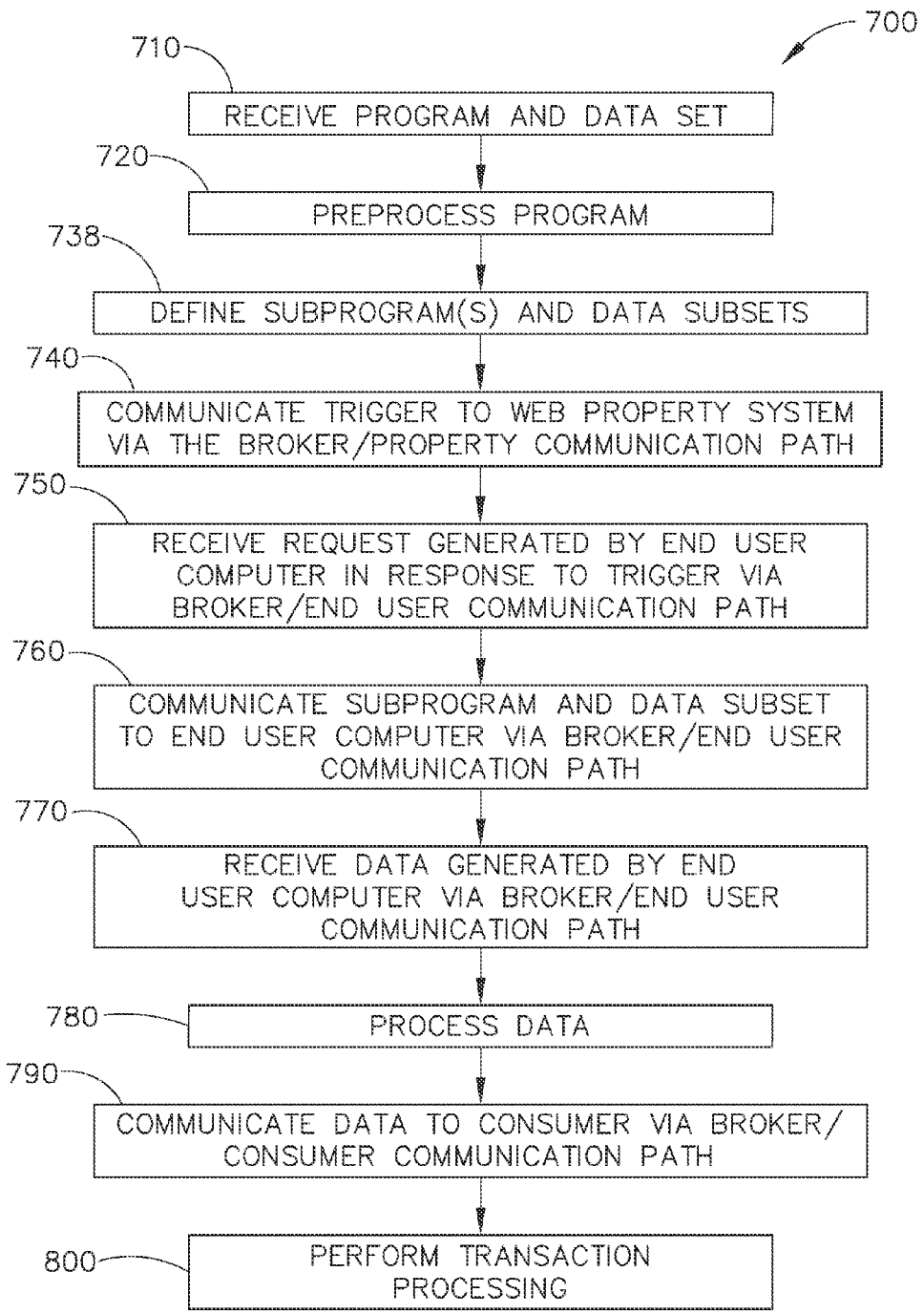
FIG. 7 is a flow chart of an exemplary method for brokering distributed computation.

FIG. 7 depicts a method for brokering distributed computing ("brokering method") 700 as performed by broker system 110. The brokering method 700 is described with reference to FIGS. 1, 6 and 7. In step 710, the consumer system interface 660 receives a computer executable program and data set. The computer executable program and data set are generally received from the consumer system 180 over the broker/consumer communication path 166. In step 720, the computer executable program may be preprocessed by the preprocessing module 680.

Figure 8:
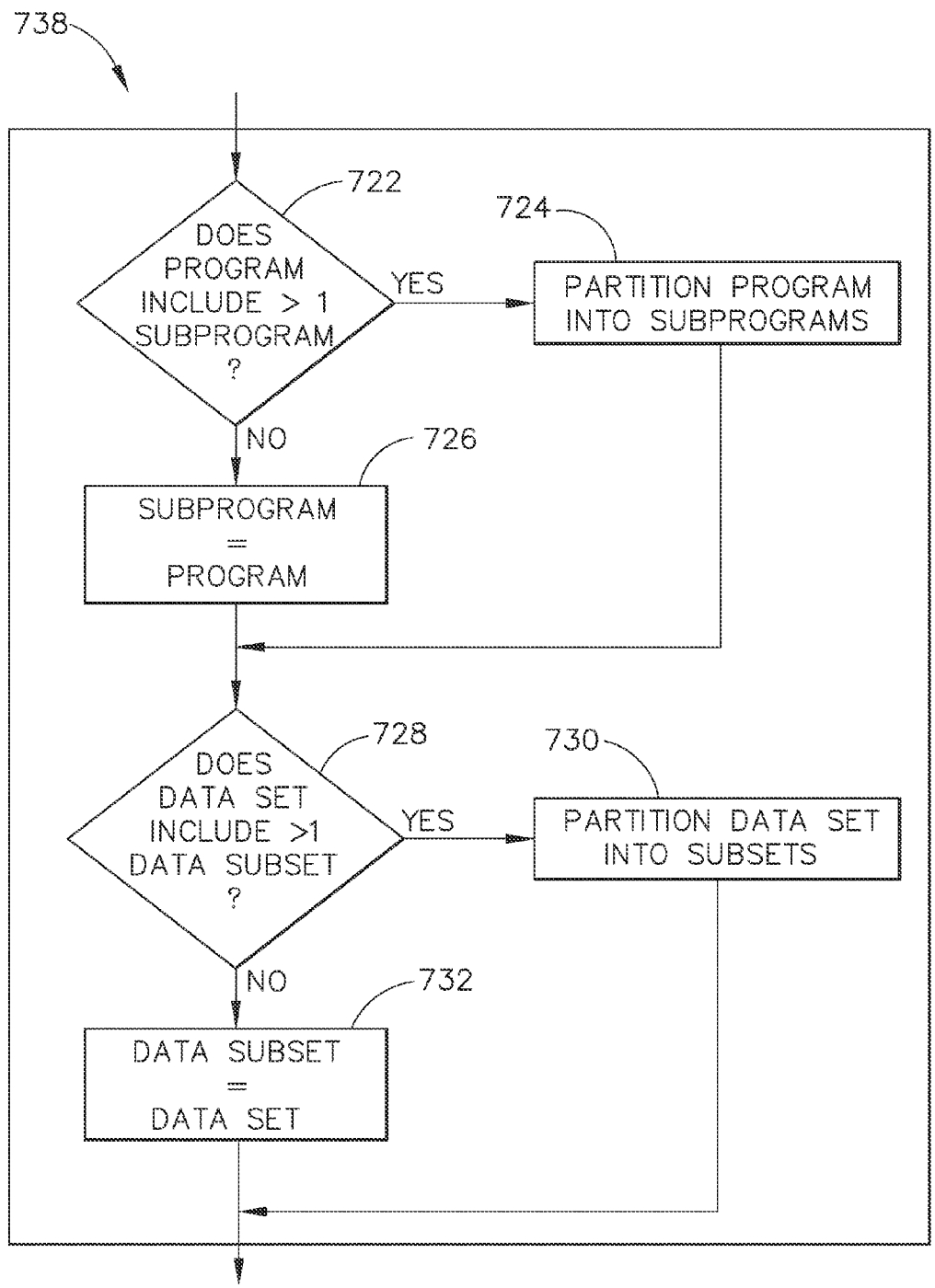
FIG. 8 is a flow chart of an exemplary method for identifying a program and a data set.

In step 730, the broker system 110 defines one or more subprograms and one or more data subsets. The details of step 738 are shown in FIG. 8, with reference to FIG. 6. In step 722, the broker system 110 determines whether the computer executable program includes more than one subprogram. If the computer executable program includes more than one subprogram, the program partitioning module 670 partitions the program into multiple subprograms in step 724. If the computer executable program does not include more than one subprogram, the computer executable program is generally defined as a subprogram in step 726. Similarly, the broker system 110 determines whether the data set includes more than one data subset in step 728. If the data set includes more than one data subset, the data set partitioning module 672 of the broker system 110 partitions the data set into multiple data subsets in step 730. If the program does not include more than one data subset, the data set is generally defined as the data subset in step 732.

Referring to FIGS. 6 and 7, in step 740, the web property system interface 630 communicates the trigger to the web property system 140 via the broker/property communication path 160. The trigger may have been generated by the trigger module 674, retrieved from the broker system database 612 or obtained from another source. In step 740, the trigger is communicated to the web property system 140 and may be associated with a web property 590 (FIG. 5).

After the end user computer 170 accesses the web property system 140, downloads the web property 590 including the trigger and responds to the trigger, the end user computer interface 642 receives a request from the end user computer 170 via broker/end user communication path 162 in step 750. In response to this request, the end user computer interface 642 communicates one or more subprograms and one or more data subsets to the end user computer 170 via the broker/end user communication path 162 in step 760.

In step 770, the end user computer interface 642 receives the data resulting from the execution of the subprogram with the data subset by the end user computer 170 via broker/end user communication path 162. The data may be stored in database 612.

In step 780, the data processing module 676 may process the data after receiving it from the end user computer 170. For example, the data processing module 676 may aggregate, group, organize, arrange and/or perform other sorting, statistical and/or other computational operations on the data resulting from executing the subprogram with the data subset and/or with data resulting from executing other subprograms with other data subsets on other end user computers, such as end user computers 172 and/or 174. The data produced by the data processing module 676 may be stored in database 612. In step 790, the consumer system interface 660 communicates the data, whether processed by the data processing module 676 or not, to the consumer system 180 via broker/consumer communication path 166.

In step 800, the transaction processing module 680 may perform, for example, various accounting functions related to services provided to the consumer system 180 by the web property system 140 and/or the broker system 110. For example, the transaction processing module may bill, receive and disburse compensation from the consumer system 180 for services provided by the broker system 110 and the web property system 140. In another example, the broker system 110 may communicate the data received from the end user computer 170 back to the end user computer 170 or another end user computer 172, 174 for further processing. The data received from the end user computer 170 may be communicated with a subprogram and/or one or more data subsets for processing the data received from the end user computer 170. This may occur before or after the data received from the end user computer is processed by the brokering system 110 in step 780.

Referring to FIG. 1, in another example, the web property system 140 may determine whether an end user computer, such as end user computer 170, has executed a subprogram with a data subset. This step may be used to prevent or limit the number of robots, or other mechanisms, from accessing resources and/or content on the web property system 140, such as setting up an account, running a computer executable program or opening a web page, without the end user computer 170 participating in distributed computation. For example, the web property system 140 may enable access to the content only after the end user computer 170 has executed a subprogram with a data subset. As the data generated by the end user computer 170 is communicated to the broker system 110, the broker system 110 may communicate to the web property system 140 that the broker system 110 has received data from the end user computer 170. Alternately, the web property system 140 may determine that the end user computer 170 has produced data using an additional communication path between the end user computer 170 and the web property system 140. In these examples, the data generated by the end user computer 170 is communicated from the end user computer 170 to the broker system 110.

In the foregoing specification, specific embodiments have been described. However, various modifications and changes can be made without departing from the scope of the claims herein. For example, method steps are not necessarily performed in the order described or depicted, unless such order is specifically indicated. Accordingly, the specification and figures are to be regarded in an illustrative rather than a restrictive sense, and all such modifications are intended to be included within the scope of the claims.

It will be appreciated that some embodiments may be comprised of one or more generic or specialized processors such as microprocessors, digital signal processors, customized processors and field programmable gate arrays ("FPGAs") and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

I claim:

1. A method for brokering distributed computation over a plurality of end user computers, comprising:

receiving, by a brokering system and from a consumer system, a data set including a plurality of data subsets;

receiving, by the brokering system and from the consumer system, a computer executable program including a plurality of computer executable subprograms;

communicating, by the brokering system, a trigger to a web property system, wherein the web property system is external to the brokering system, wherein the trigger includes an address for communication with the brokering system by one or more of the plurality of end user computers, and wherein the trigger is configured to be implemented in a web property by the web property system and to be responded to by one or more of the plurality of end user computers when the web property is accessed by one or more of the plurality of end user computers;

receiving, by the brokering system, a request from a particular end user computer, wherein the request is generated in response to the trigger;

communicating, by the brokering system and in response to the request, at least one computer executable subprogram of the plurality of computer executable subprograms and at least one data subset of the plurality of data subsets to the particular end user computer in response to the request; and receiving, by the brokering system, results data resulting from executing the at least one computer executable subprogram with the at least one data subset on the particular end user computer; and in response to receiving the results data resulting from executing the at least one computer executable subprogram with the at least one data subset on the particular end user computer:

communicating, by the brokering system and to the web property system, a notification that the results data has been received by the brokering system from the particular end user computer;

aggregating, by the brokering system, the results data resulting from executing the at least one computer executable subprogram with the at least one data subset on the particular end user computer with stored results data resulting from executing one or more other computer executable subprograms with one or more other data subsets on one or more other end user computers; and communicating, by the brokering system and to the consumer system, the aggregated results data.

2. The method of claim 1 further comprising partitioning the data set into at least two data subsets.

3. The method of claim 1 further comprising partitioning the computer executable program into at least two computer executable subprograms.

4. The method of claim 1, further comprising processing, by the brokering system, the results data resulting from executing the at least one computer executable subprogram with the at least one data subset on the particular end user computer.

5. The method of claim 1, further comprising preprocessing, by the brokering system, the computer executable program.

6. The method of claim 5, wherein preprocessing the computer executable program comprises translating the computer executable program from a first programming language to a second, different, programming language.

7. The method of claim 5, wherein preprocessing the computer executable program comprises modifying the computer executable program to limit its use of processing capabilities of the plurality of end user computers.

8. The method of claim 5, wherein preprocessing the computer executable program comprises modifying the computer executable program to facilitate detection of incorrect results data resulting from executing the computer executable program on the plurality of end user computers.

9. The method of claim 1, further comprising communicating, by the brokering system and to the consumer system, the results data resulting from executing the at least one computer executable subprogram with the at least one data subset on the particular end user computer.

10. The method of claim 1, further comprising facilitating compensation for services provided by the brokering system and the web property system for the consumer system, wherein facilitating compensation includes receiving compensation by the brokering system and from the consumer system, retaining a portion of the compensation by the brokering system, and communicating remaining compensation by the brokering system and to the web property system.

11. The method of claim 1, wherein the web property is accessed by the particular end user computer, and wherein the notification that the results data has been received by the brokering system from the particular end user computer is configured to cause the web property system to provide the particular end user computer with access to content.

12. The method of claim 1, wherein the trigger is implemented in one or more of an iframe, snippet, agent, application, or widget.

13. A method for brokering distributed computation over a plurality of end user computers, comprising:
  communicating, by a brokering system, a trigger to a web property system, wherein the web property system is external to the brokering system, wherein the trigger includes an address for communication with the brokering system by one or more of the plurality of end user computers, and wherein the trigger is configured to be implemented in a web property by the web property system and to be responded to by one or more of the plurality of end user computers when the web property is accessed by one or more of the plurality of end user computers;
  receiving, by the brokering system, a request from a particular end user computer, wherein the request is generated in response to the trigger;
  communicating, by the brokering system and in response to the request, at least one computer executable subprogram of a plurality of computer executable subprograms and at least one data subset of a plurality of data subsets to the particular end user computer in response to the request;
  receiving, by the brokering system, results data resulting from executing the at least one computer executable subprogram with the at least one data subset on the particular end user computer; and
  in response to receiving the results data resulting from executing the at least one computer executable subprogram with the at least one data subset on the particular end user computer:
    communicating, by the brokering system and to the web property system, a notification that the results data has been received by the brokering system from the particular end user computer;
    aggregating, by the brokering system, the results data resulting from executing the at least one computer executable subprogram with the at least one data subset on the particular end user computer with stored results data resulting from executing one or more other computer executable subprograms with one or more other data subsets on one or more other end user computers; and
    communicating, by the brokering system and to a consumer system, the aggregated results data.

14. A brokering system for distributed computation, in which data is computed by executing a plurality of computer executable subprograms of a computer executable program with a plurality of data subsets of a data set over a plurality of end user computers, comprising:
  a database storing the plurality of computer executable subprograms, the plurality of data subsets, and a trigger, wherein the trigger includes an address for communication with the brokering system by the plurality of end user computers;
  a first interface in communication with a web property system that includes a web property, wherein the web property system is external to the brokering system, and wherein the first interface is configured to communicate the trigger to the web property system; and
  a second interface in communication with the plurality of end user computers, wherein the second interface is configured to:
    (i) communicate at least one data subset of the plurality of data subsets and at least one computer executable subprogram of the plurality of computer executable subprograms to a particular end user computer in response to a request from the particular end user computer, wherein the request is generated in response to the trigger;
    (ii) receive results data resulting from executing the at least one computer executable subprogram with the at least one data subset on the particular end user computer; and
    (iii) in response to receiving the results data resulting from executing the at least one computer executable subprogram with the at least one data subset on the particular end user computer:
      communicate, by the brokering system and to the web property system, a notification that the results data has been received by the brokering system from the particular end user computer;
      aggregate, by the brokering system, the results data resulting from executing the at least one computer executable subprogram with the at least one data subset on the particular end user computer with stored results data resulting from executing one or more other computer executable subprograms with one or more other data subsets on one or more other end user computers; and
      communicate, by the brokering system and to a consumer system, the aggregated results data.

15. The brokering system of claim 14, further comprising a data set partitioning module configured to partition the data set into the plurality of data sub sets.

16. The brokering system of claim 15 further comprising a data processing module, wherein the data processing module includes computer executable software.

17. The brokering system of claim 14, further comprising a program partitioning module configured to partition the computer executable program into the plurality of computer executable subprograms.

18. The brokering system of claim 14, further comprising a third interface in communication with a consumer system, wherein the third interface is configured to receive the computer executable program and the data set from the consumer system.

19. The brokering system of claim 14, further comprising a transaction processing module configured to receive compensation for services provided by the brokering system and the web property system for the consumer system, wherein the transaction processing module includes computer executable software.

20. The brokering system of claim 14 further comprising a preprocessing module, wherein the preprocessing module includes computer executable software.

21. The brokering system of claim 14 further comprising a trigger module configured to generate the trigger, wherein the trigger module includes computer executable software.

22. One or more non-transitory computer readable storage media storing instructions that when executed by one or more processing devices perform a method for brokering distributed computation over a plurality of end user computers, the method comprising:
  receiving, by a brokering system and from a consumer system, a data set including a plurality of data subsets;

receiving, by the brokering system and from the consumer system, a computer executable program including a plurality of computer executable subprograms;

communicating, by the brokering system, a trigger to a web property system, wherein the web property system is external to the brokering system, wherein the trigger includes an address for communication with the brokering system by one or more of the plurality of end user computers, and wherein the trigger is configured to be implemented in a web property by the web property system and to be responded to by one or more of the plurality of end user computers when the web property is accessed by one or more of the plurality of end user computers;

receiving, by the brokering system, a request from a particular end user computer, wherein the request is generated in response to the trigger;

communicating, by the brokering system and in response to the request, at least one computer executable subprogram of the plurality of computer executable subprograms and at least one data subset of the plurality of data subsets to the particular end user computer in response to the request;

receiving, by the brokering system, results data resulting from executing the at least one computer executable subprogram with the at least one data subset on the particular end user computer; and in response to receiving the results data resulting from executing the at least one computer executable subprogram with the at least one data subset on the particular end user computer:

communicating, by the brokering system and to the web property system, a notification that the results data has been received by the brokering system from the particular end user computer;

aggregating, by the brokering system, the results data resulting from executing the at least one computer executable subprogram with the at least one data subset on the particular end user computer with stored results data resulting from executing one or more other computer executable subprograms with one or more other data subsets on one or more other end user computers; and communicating, by the brokering system and to the consumer system, the aggregated results data.

* * * * *